(12) United States Patent
Huang et al.

(10) Patent No.: US 8,849,772 B1
(45) Date of Patent: *Sep. 30, 2014

(54) DATA REPLICATION WITH DELTA COMPRESSION

(75) Inventors: Mark Huang, Seattle, WA (US); Philip Shilane, Morrisville, PA (US); Grant Wallace, Ewing, NJ (US); Ming Benjamin Zhu, Austin, TX (US)

(73) Assignee: EMC Corporation, Hopkinton, MA (US)

( * ) Notice: Subject to any disclaimer, the term of this patent is extended or adjusted under 35 U.S.C. 154(b) by 764 days.

This patent is subject to a terminal disclaimer.

(21) Appl. No.: 12/291,997

(22) Filed: Nov. 14, 2008

(51) Int. Cl.
   *G06F 7/00* (2006.01)
   *G06F 17/00* (2006.01)
   *G06F 11/14* (2006.01)

(52) U.S. Cl.
   CPC ........ *G06F 11/1453* (2013.01); *G06F 11/1464* (2013.01)
   USPC ........... 707/692; 707/640; 707/693; 707/694; 711/161; 711/216

(58) Field of Classification Search
   CPC .. G06F 11/1453; G06F 11/1464; H03M 7/30; H03M 7/3091
   USPC ........... 707/640, 692, 693, 694; 711/161, 216
   See application file for complete search history.

(56) References Cited

U.S. PATENT DOCUMENTS

| | | | |
|---|---|---|---|
| 5,574,906 A | 11/1996 | Morris | |
| 5,990,810 A * | 11/1999 | Williams | 341/51 |
| 6,349,296 B1 | 2/2002 | Broder et al. | |
| 6,374,250 B2 | 4/2002 | Ajtai et al. | |
| 6,658,423 B1 * | 12/2003 | Pugh et al. | 1/1 |
| 7,287,019 B2 | 10/2007 | Kapoor et al. | |
| 7,567,188 B1 | 7/2009 | Anglin et al. | |
| 7,669,023 B2 | 2/2010 | Murase | |
| 7,747,584 B1 | 6/2010 | Jernigan, IV | |
| 7,921,077 B2 * | 4/2011 | Ting et al. | 707/610 |
| 7,949,662 B2 | 5/2011 | Farber et al. | |
| 8,190,835 B1 | 5/2012 | Yueh | |
| 2003/0097359 A1 | 5/2003 | Ruediger | |
| 2004/0174276 A1 * | 9/2004 | McCanne et al. | 341/50 |
| 2005/0044294 A1 | 2/2005 | Vo et al. | |
| 2005/0086246 A1 | 4/2005 | Wood et al. | |
| 2005/0131939 A1 * | 6/2005 | Douglis et al. | 707/103 Y |
| 2005/0182780 A1 | 8/2005 | Forman et al. | |

(Continued)

FOREIGN PATENT DOCUMENTS

| | | |
|---|---|---|
| EP | EP 1641219 | 3/2006 |
| WO | 2004012338 A2 | 2/2004 |

OTHER PUBLICATIONS

Mandagere et al, "Data De-duplication using Object Based Storage", University of Minnesota Digital Technology Center Intelligent Storage Consortium, May 18, 2007.

(Continued)

*Primary Examiner* — Shew-Fen Lin
(74) *Attorney, Agent, or Firm* — Van Pelt, Yi & James LLP

(57) ABSTRACT

Data replication with delta compression is disclosed. A primary system and a replica system are determined to both have an identical first data segment that is similar to a second data segment. The second data segment is encoded, wherein the encoding refers to the first data segment.

51 Claims, 11 Drawing Sheets

(56) References Cited

U.S. PATENT DOCUMENTS

| | | | |
|---|---|---|---|
| 2005/0219075 A1* | 10/2005 | Storer et al. | 341/51 |
| 2006/0101060 A1* | 5/2006 | Li et al. | 707/102 |
| 2007/0239946 A1 | 10/2007 | Zhu | |
| 2008/0013830 A1 | 1/2008 | Patterson et al. | |
| 2008/0109428 A1 | 5/2008 | Suciu et al. | |
| 2008/0133561 A1* | 6/2008 | Dubnicki et al. | 707/101 |
| 2008/0256143 A1* | 10/2008 | Reddy et al. | 707/204 |
| 2009/0193223 A1 | 7/2009 | Saliba et al. | |
| 2009/0204636 A1 | 8/2009 | Li et al. | |
| 2009/0234892 A1 | 9/2009 | Anglin et al. | |

OTHER PUBLICATIONS

Douglis et al "Application-specific Delta-encoding via Resemblance Detection", IBM T. J. Watson Research Center, 2002.

Nevin Heintze, "Scalable Document Fingerprinting" (Extended Abstract), Bell Laboratories, 1996.

Spring et al. "A Protocol-Independent Technique for Eliminating Redundant Network Traffic", In Proc. of ACM SIGCOMM, pp. 87-95, Aug. 2000.

Muthitacharoen et al. "A Low-bandwidth Network File System ", In *Proceedings of the ACM 18th Symposium on Operating Systems Principles*. Banff, Canada. Oct. 2001.

Jain et al. "TAPER: Tiered Approach for Eliminating Redundancy in Replica Synchronization", 4th USENIX Conference on File and Storage Technologies (FAST '05), Dec. 14-16, 2005, San Francisco, CA.

Andrew Tridgell "Efficient Algorithms for Sorting and Synchronization". Doctor of Philosophy Thesis, The Australian National University, Feb. 1999.

Chan et al. "Cache-Based Compaction: A New Technique for Optimizing Web Transfer", *Mobile and Wireless Internet: Protocols, Algorithms and Systems*, edited by Kia Makki et. al. Kluwer Academic Publishers, Jul. 2003.

Karp et al. "Efficient randomized pattern-matching algorithms", *IBM Journal of Research and Development* 31 (2), 249-260. Mar. 1987.

Randal C. Burns, "Differential Compression: A Generalized Solution for Binary Files" MS Thesis, University of California at Santa Cruz, 1997.

Joshua P. MacDonald, "File System Support for Delta Compression", Masters thesis. Department of Electrical Engineering and Computer Science, University of California at Berkeley, 2000.

Ajtai et al. "Compactly Encoding Unstructured Inputs with Differential Compression" *J. ACM* 49, 3. pp. 318-367. May 2002.

Douglis et al. "Application-Specific Delta-Encoding via Resemblance Detection", In Proc. of the USENIX Annual Technical Conference, Jun. 2003.

Suel et al. "Algorithms for Delta Compression and Remote File Synchronization", In Khalid Sayood, editor, Lossless Compression Handbook. Academic Press, 2002.

Trendafilov et al. "Zdelta: An Efficient Delta Compression Tool", Technical Report TR-CIS-2002-02, Polytechnic University, Jun. 26, 2002.

Andrei Z. Broder, "Algorithms for Duplicate Documents", Lecture Notes, Feb. 18, 2005.

Andrei Z. Broder "Identifying and Filtering Near-Duplicate Documents", COM '00: Proceedings of the 11th Annual Symposium on Combinatorial Pattern Matching. pp. 1-10, Springer-Verlag, 2000.

Andrei Z. Broder, "On the Resemblance and Containment of Documents", In Proceedings of Compression and Complexity of SEQUENCES 1997.

Broder et al. "Syntactic Clustering of the Web", Computer Networks. 29(8-13): 1157-1166. 1997. http://www.std.org/~msm/common/clustering.html.

Broder et al. "Min-Wise Independent Permutations", Journal of Computer Systems and Sciences, vol. 60(3), pp. 630-659 (2000) (special issue for STOC '98), preliminary version in Proceedings of the 30th Annual ACM Symposium on Theory of Computing (1998).

Moses S. Charikar, "Similarity Estimation Techniques from Rounding Algorithms", *Proceedings of the 34th Annual ACM Symposium on Theory of Computing*, pp. 380-388. 2002.

Monika Henzinger, "Finding Near-Duplicate Web Pages: A Large-Scale Evaluation of Algorithms", In *29th Annual International ACM SIGIR Conference on Research and Development in Information Retrieval*, vol. 2006, pp. 284-291, 2006.

Broder et al. "On the Computation of the Minima of Random Functions", paper submitted for the conference: Algorithm Engineering, 3rd International Workshop, WAE '99, London, UK, Jul. 19-21, 1999.

Udi Manber, "Finding Similar Files in a Large File System", In *Proceedings of the USENIX Winter 1994 Technical Conference*, San Francisco, CA, USA, 1994.

Bobbarjung et al. "Improving Duplicate Elimination in Storage Systems", ACM Transactions on Storage, vol. 2, No. 4, Nov. 2006, pp. 424-448.

Kulkarni et al. "Redundancy Elimination Within Large Collections of Files" https://iweb.datadomain.com/princeton/files/bib/douglis04.pdf, USENIX Annual Technical Conference, Boston, MA, Jun. 2004.

Jain et al. "TAPER: Tiered Approach for Eliminating Redundancy in Replica Synchronization", Fast '05: 4th USENIX Conference on File and Storage Technologies, pp. 281-294, Dec. 31, 2005.

* cited by examiner

DATA REPLICATION WITH DELTA COMPRESSION

BACKGROUND OF THE INVENTION

Enterprises as well as individuals are becoming increasingly dependent on computers. As more and more data are generated, the need for efficient and reliable data backup storage systems is increasing. There are a variety of systems in existence today, utilizing both local and remote storage for backup. Some backup systems use both a local backup system and a replica backup system in a remote location in order to ensure the safety of the data. Synchronization of the local system and the replica system can be simplified by using the network to transmit data from the local system to the replica system. However, for large systems, speed of data transmission can limit the feasibility of network backup replication.

BRIEF DESCRIPTION OF THE DRAWINGS

Various embodiments of the invention are disclosed in the following detailed description and the accompanying drawings.

DETAILED DESCRIPTION

Figure 1:
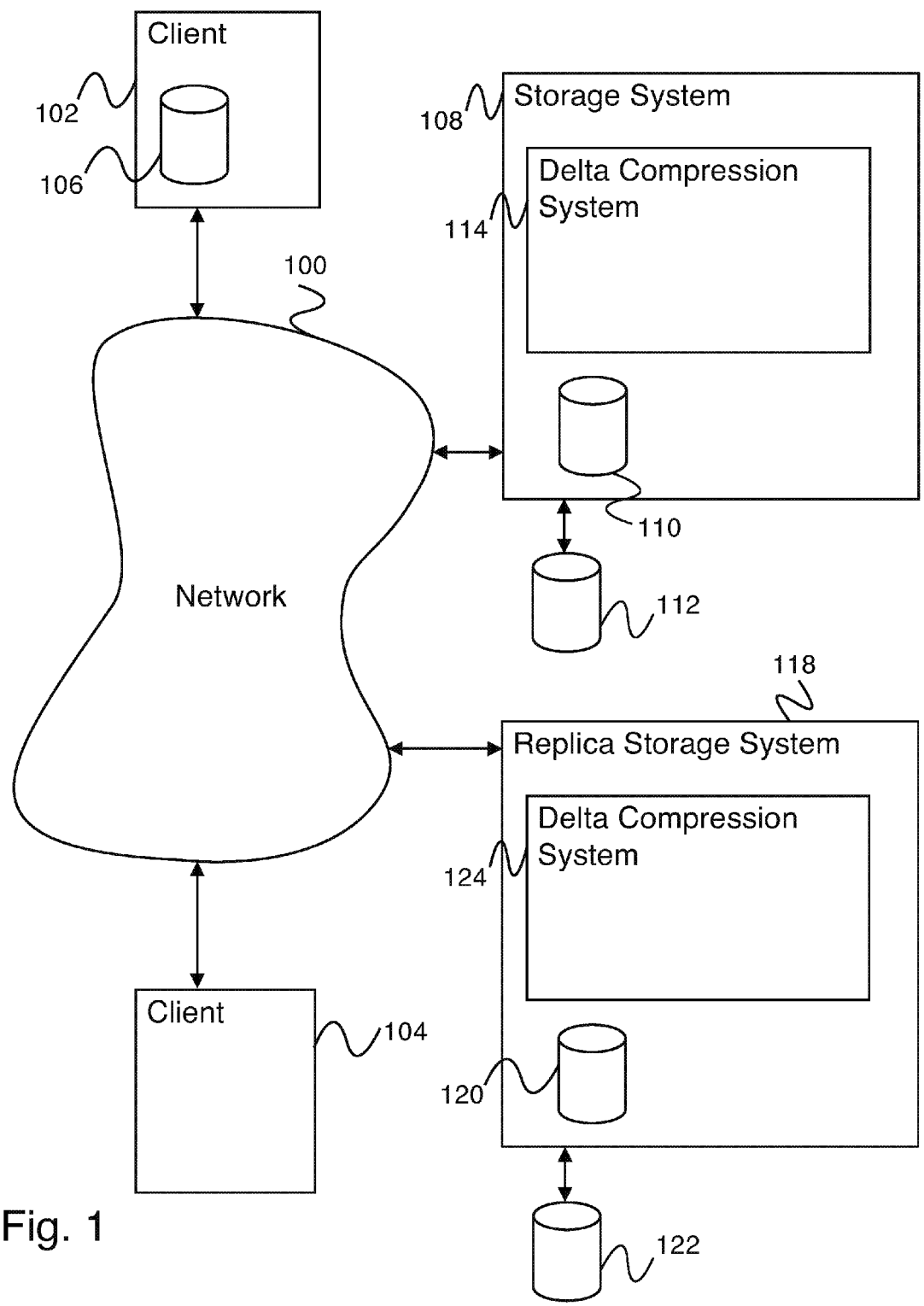
FIG. 1 is a block diagram illustrating a system for data replication with delta compression.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data replication with delta compression is disclosed. Enterprise data systems typically contain a large amount of redundancy, either in files that are stored in multiple places in the system or in files that are stored multiple times with only slight variations. When a replica backup system is created or updated from a primary backup system, the necessary amount of network transmission can be minimized by exploiting the redundancy in the system. Data on the primary and replica systems are stored in a large number of small segments. When a segment is to be transmitted over the network from the primary system to the replica system, it is analyzed for similarity to any segments that are already stored on both the primary and replica systems. If the segment is determined to be similar to segment(s) that is/are already stored on both the primary and replica systems, it is encoded as a set of differences from the already stored segment(s), and the encoding is transmitted. The encoded segment is received by the replica system, decoded using the copy of the stored segment(s) on the replica, and stored on the replica. Encoding in this way can reduce the necessary amount of transmission over the network and speed backup replication. In some embodiments, the replica stores the encoded segment and decoding occurs in the event a reconstructed segment is desired.

In various embodiments, the primary system, the replica system, or the replica system and the primary system determine that the received data segment is similar to a data segment that is stored on both a primary system and a replica system of a delta compression system.

In some embodiments, a sketch system uses or does not use a cache to find similar segments. In some embodiments, a sketch system uses one or more functions to characterize a segment and can use the characteristics generated by those functions to determine similarity and in some cases degree or amount of similarity.

FIG. 1 is a block diagram illustrating a system for data replication with delta compression. In the example shown, network 100 connects one or more clients, represented in FIG. 1 by clients 102 and 104. A client may have a local storage device in addition to local memory. For example, client 102 has storage device 106, whereas client 104 does not have a local storage device. Network 100 also connects to storage system 108 and replica storage system 118. Storage system 108 stores data either using internal storage device 110 or attached external storage device 112. Replica storage system 118 stores data either using internal storage device 120 or attached external storage device 122.

Storage system 108 comprises delta compression system 114, which performs segment delta compression or decompression on a data stream. Replica storage system 118 comprises delta compression system 124, which performs segment delta compression or decompression on a data stream. Delta compression systems 114 and 126 are used to reduce the amount of network communication necessary to cause the data stored in storage devices 120 and 122 to replicate some or all of the data stored in storage devices 110 and 112.

In some embodiments, delta compression is assisted by a sketch system, which comprises sketch data associated with a segment used to store data and/or files by a storage system, along with the corresponding location in memory of the segment. In some embodiments, sketch data comprises one or more data characterizing a segment. In some embodiments, one or more functions (e.g., hash functions) act on a segment and a subset of the results of the functions acting on the segment (e.g., a number of results, for example the ten lowest results or the ten highest results) are selected as a sketch. In some embodiments, sketch data is used in order to determine if a new segment is similar to a previously stored segment (e.g., by an exchange of a sketch or comparison of sketches associated with a new and/or previously stored segment(s)). For example, a segment is determined to be similar to another segment when a predetermined fraction of the one or more sketch data of the segments are identical. In various embodiments, the predetermined fraction comprises all of the sketch data, a majority of the sketch data, 75%, 80%, ⅔, a fraction dependent on other factors (e.g., relative to other sketch comparisons or a subset of comparisons) or any other appropriate fraction of sketch data. In various embodiments, the elements of the sketch are treated as a vector and a metric based on a distance between vectors is used to determine similarity, or any other appropriate metric or measure of similarity.

Network 100 comprises one or more of the following: a local area network, a wide area network, a wired network, a wireless network, the Internet, a fiber network, a storage area network, or any other appropriate network enabling communication. Clients 102 and 104, storage system 108 and replica storage system 118 may be in physical proximity or may be physically remote from one another.

In various embodiments, storage devices 106, 110, 112, 120, and 122 comprise a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In various embodiments, storage system 108 comprises one or more processors as part of one or more physical units (e.g., computers or other hardware units). In various embodiments, replica storage system 118 comprises one or more processors as part of one or more physical units (e.g., computers or other hardware units).

In some embodiments, files or data stored on a client are backed up on storage system 108. The files or data are broken into segments by storage system 108. A mapping is stored between the files or data and the segments. If an identical segment is already stored by storage system 108, a pointer to the segment is stored. If a similar segment is already stored by storage system 108, a pointer to the similar previously stored segment is stored as well as the difference between the similar previously stored segment and the new segment to be stored. The mapping along with the pointers, stored segments and stored similar segments and differences from the similar segments can be used to reconstruct the original files or data. In some embodiments, more than one previously stored segment is identified as similar and portions of the more than one previously stored segments are referenced and differences between the portions and the new segment are stored to store the new segment.

Figure 2A:
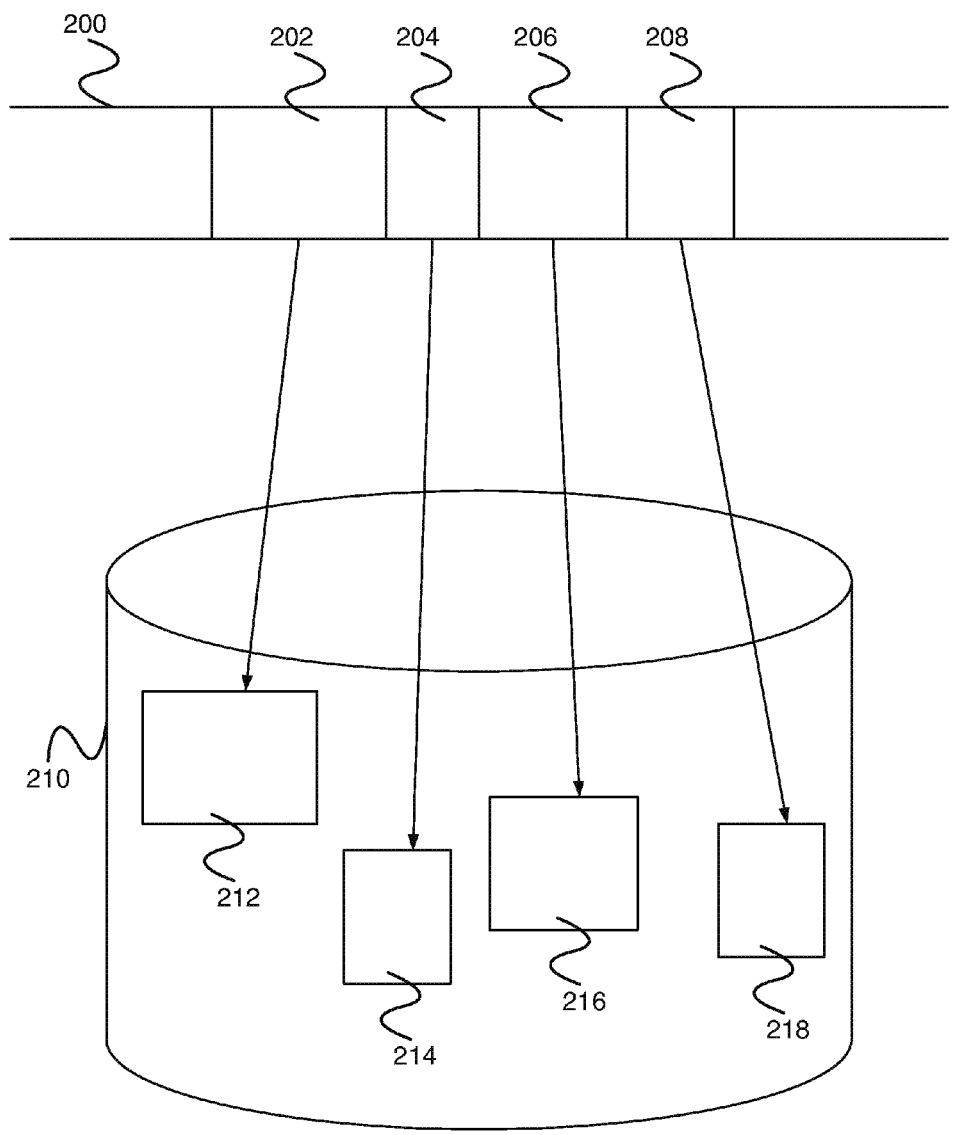
FIG. 2A is a block diagram illustrating an embodiment of a segmented data storage system.

FIG. 2A is a block diagram illustrating an embodiment of a segmented data storage system. In the example shown, data stream or data block 200 is received by a data storage system (e.g., storage system 108 of FIG. 1). Data stream or data block 200 is sent from one or more clients (e.g., client 102 or client 104 of FIG. 1). Data stream or data block 200 is to be stored in storage device 210, representing a storage device of a storage system (e.g., storage device 110 or storage device 112 of storage system 108 of FIG. 1).

Data stream or data block 200 is segmented into segments 202, 204, 206 and 208. Data stream or data block 200 is segmented by creating a plurality of segments from data stream or data block 200 that can be used to reconstruct data stream or data block 200. Segments, when used to reconstruct data stream or data block 200, can be overlapping, non-overlapping, or a combination of overlapping and non-overlapping. Segment boundaries are determined using file boundaries, directory boundaries, byte counts, content-based boundaries (e.g., when a hash of data in a window is equal to a value), or any other appropriate method of determining a boundary. Reconstruction of a data block, data stream, file, or directory includes using references to the one or more segments that originally made up a data block, data stream, file, or directory that is agreed to be stored on a storage system and a replica system. Data segments 202, 204, 206, and 208 are stored in storage device 210 as stored data segments 212, 214, 216 and 218, respectively.

Figure 2B:
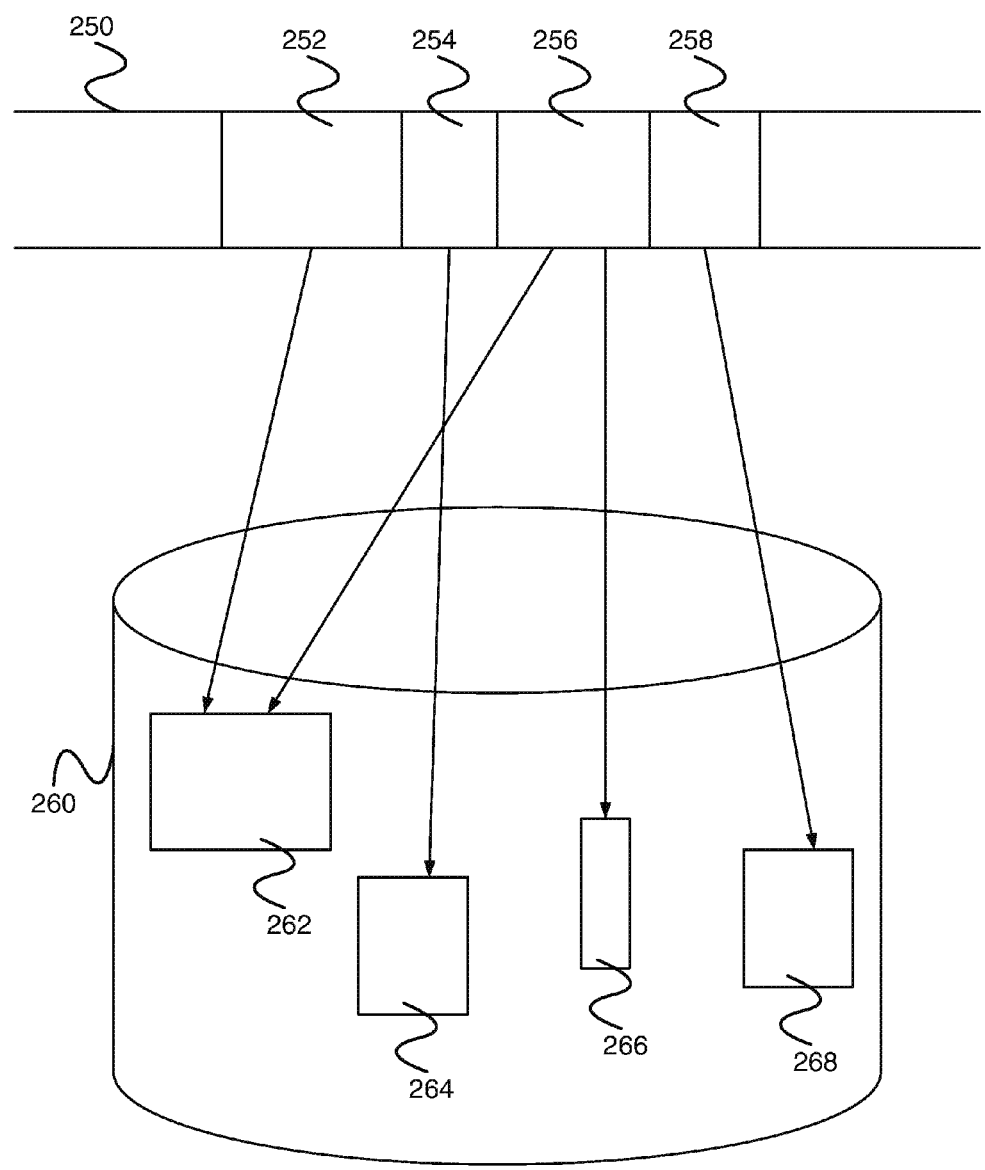
FIG. 2B is a block diagram illustrating an embodiment of a segmented data storage system.

FIG. 2B is a block diagram illustrating an embodiment of a segmented data storage system. In the example shown, data stream or data block 250 is received by a data storage system (e.g., storage system 108 of FIG. 1). Data stream or data block 250 is sent from one or more clients (e.g., client 102 or client 104 of FIG. 1). Data stream or data block 250 is to be stored in storage device 260, representing a storage device of a storage system (e.g., storage device 110 or storage device 112 of storage system 108 of FIG. 1).

Data stream or data block 250 is segmented into segments 252, 254, 256 and 258. Data stream or data block 250 is segmented by creating a plurality of segments from data stream or data block 250 that can be used to reconstruct data stream or data block 250. Segments, when used to reconstruct data stream or data block 250, can be overlapping, non-overlapping, or a combination of overlapping and non-overlapping. Segment boundaries are determined using file boundaries, directory boundaries, byte counts, content-based boundaries (e.g., when a hash of data in a window is equal to a value), or any other appropriate method of determining a boundary. Reconstruction of a data block, data stream, file, or directory includes using references to the one or more segments that originally made up a data block, data stream, file, or directory that is agreed to be stored on a storage system and a replica system. Data segments 252, 254, and 258 are stored in storage device 260 as stored data segments 262, 264, and 268; respectively. Data segment 256 is stored as a reference to data segment 262 and delta 266 that indicates the difference between data segment 256 and previously stored data segment 262. In various embodiments, there are no differences between data segment 256 and previously stored data segment 262 so that delta 266 is a null set or no delta 266 is referred to and only a reference to data segment 262 is used to store data segment 256 or any other appropriate encoding of a previously stored segment using one or more previously stored segments or references thereto and difference(s) or delta(s) therefrom.

In some embodiments, segments determined to be identical to segments already stored in the storage system (e.g., storage system 108 of FIG. 1) are stored as a reference to the previously stored segment. In some embodiments, segments determined to be similar to segments already stored in the storage system (e.g., storage system 108 of FIG. 1) are stored as a reference plus a representation of the difference between the two segments (e.g., data segment 256 as stored by data segment 262 or reference thereto and delta 266 in FIG. 2B).

Figure 3:
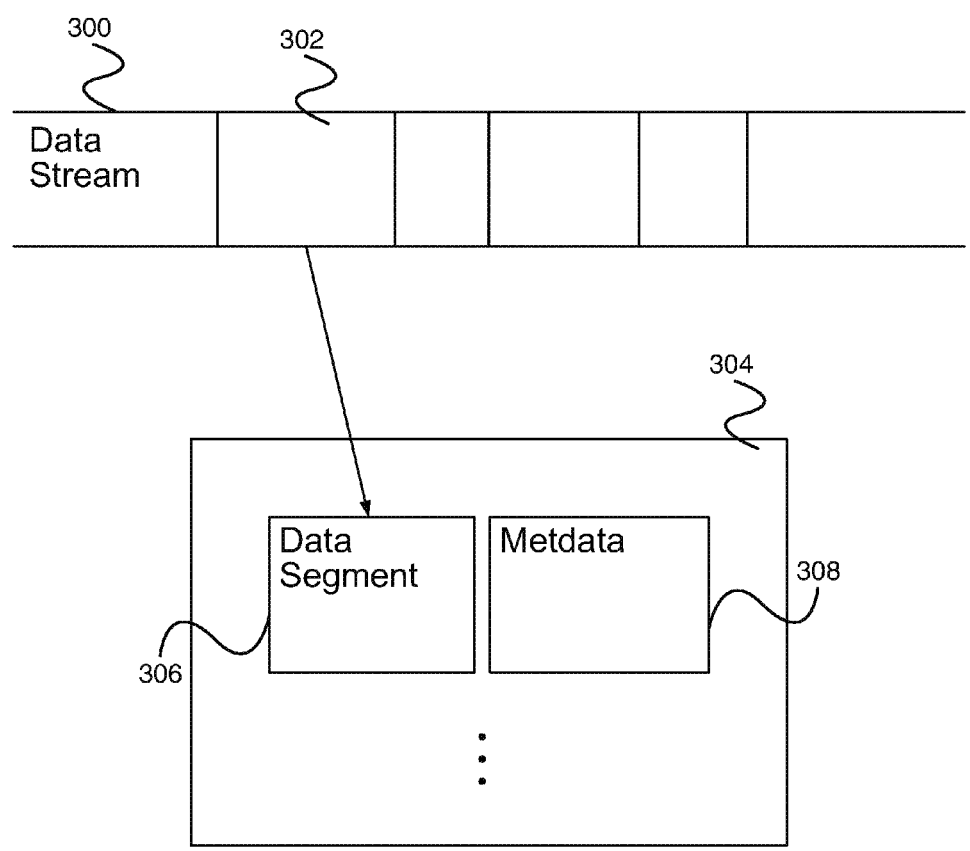
FIG. 3 is a block diagram illustrating an embodiment of data segmentation and storage.

FIG. 3 is a block diagram illustrating an embodiment of data segmentation and storage. In the example shown, data stream 300 is received by a data storage system (e.g., storage system 108 of FIG. 1). Data stream 300 is sent from one or more clients (e.g., client 102 or client 104 of FIG. 1). Data stream 300 is to be stored in a storage device of a storage system (e.g., storage device 110 or storage device 112 of FIG. 1). Data stream 300 is segmented into a plurality of data segments, including data segment 302. In some embodiments, segments are segmented by identifying segment boundaries that are content-based—for example, a hash function is applied to values of data within a sliding window through the data stream or block and when the hash function is equal to a value (or equal to one of several values) then a segment boundary is identified. In various embodiments, segment boundaries are identified using content based functions operating on windows within a data stream or block that have a minimum or maximum or other value or any other appropriate content based segmenting algorithm. In various embodiments; segments comprise fixed-length segments, variable length segments, overlapping segments, non-overlapping segments, segments with a minimum size, segments with a maximum size, or any other appropriate segments. In various embodiments, segments comprise files, groups of files, directories, a portion of a file, a portion of a data stream with one or more boundaries unrelated to file and/or directory boundaries, or any other appropriate segment.

Data segment 302 is stored in the storage system as stored data segment 306. Stored data segment 306 is stored as part of data storage container 304. Data storage container 304 stores one or more data segments along with metadata associated with the data segments. For example, metadata associated with data segment 306 is stored as metadata 308. Metadata 308 comprises a data segment identifier (ID) and, in some embodiments, a data segment sketch. In various embodiments, a data segment ID comprises a deterministic function of a data segment, a plurality of deterministic functions of a data segment, a hash function of a data segment, a plurality of hash functions of a data segment, random data, or any other appropriate data segment ID. In various embodiments, a data segment sketch comprises one or more deterministic functions of a data segment, one or more hash functions of a data segment, one or more functions that return the same value for similar data segments, one or more functions that return similar values for similar data segments, one or more functions that may return the same value for similar data segments (e.g., a function that probably or likely returns a same value for a similar data segment), one or more functions that may return similar values for similar data segments (e.g., a function that probably or likely returns a similar value for a similar data segment), random data, or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity.

In various embodiments, metadata (e.g., metadata 308) comprises a data segment ID, a data segment sketch, a hash of a data segment, an encrypted hash of a data segment, random data, or any other appropriate metadata.

In some embodiments, metadata associated with a segment is used to identify identical and/or similar data segments. In some embodiments, stored metadata enables a faster identification of identical and/or similar data segments as an identifier (e.g., and ID) and/or sketch (e.g., a set of values characterizing the data segment) do not need to be recomputed for the evaluation of a given incoming data segment.

Figure 4A:
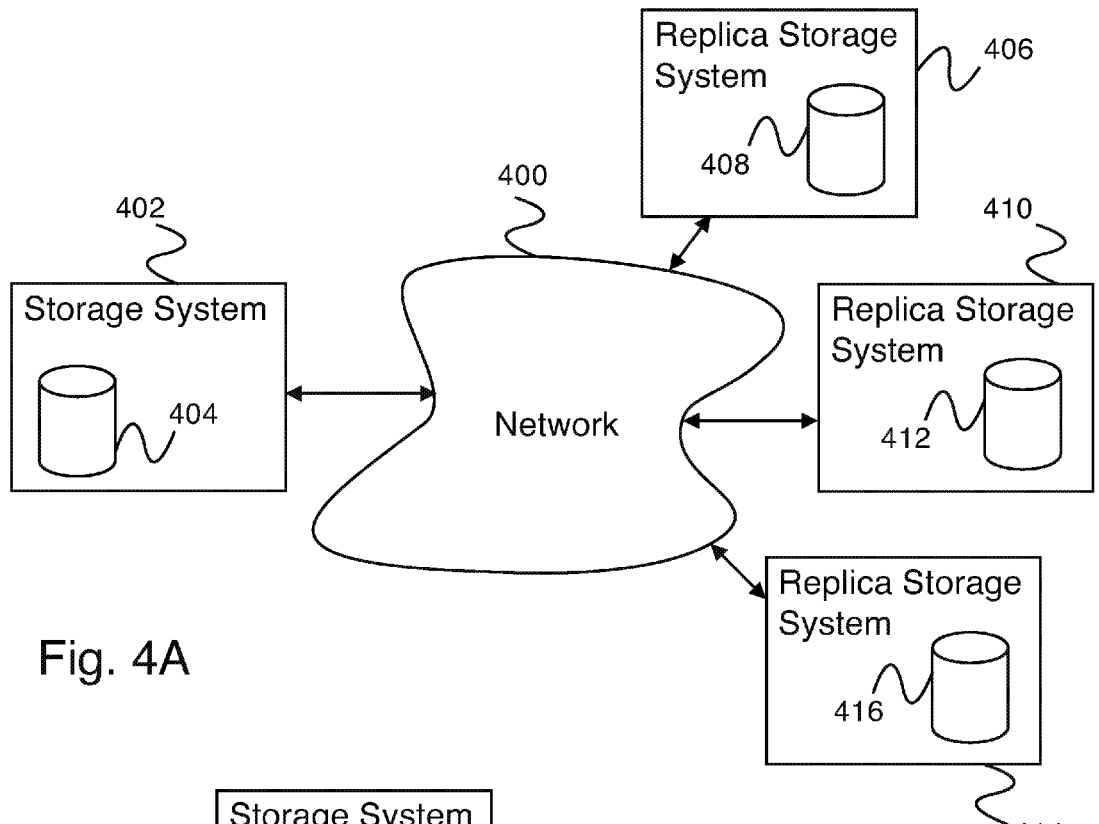
FIG. 4A is a block diagram illustrating an embodiment of a network system with data replication.

FIG. 4A is a block diagram illustrating an embodiment of a network system with data replication. In some embodiments, the network system shown comprises an embodiment of the data replication with delta compression system shown in FIG. 1. In the example shown, network 400 connects storage system 402 with replica storage systems 406, 410 and 414. Storage system 402 stores data in storage device 404, and replica storage systems 406, 410 and 414 store data in storage devices 408, 412 and 416 respectively. Replica storage systems 406, 410 and 414 replicate data stored by storage system 402 on storage device 404 on storage devices 408, 412 and 416. Each of replica systems 406, 410 and 414 replicate a portion of or all of the data stored by storage system 402. In various embodiments, the portions of the data stored by storage system 402 replicated by each of replica storage systems 406, 410 and 414 are overlapping, not overlapping, or are a combination of overlapping and not overlapping. In various embodiments, one, three, five, or any other appropriate number of replica systems are used to replicate the data stored by storage system 402.

Figure 4B:
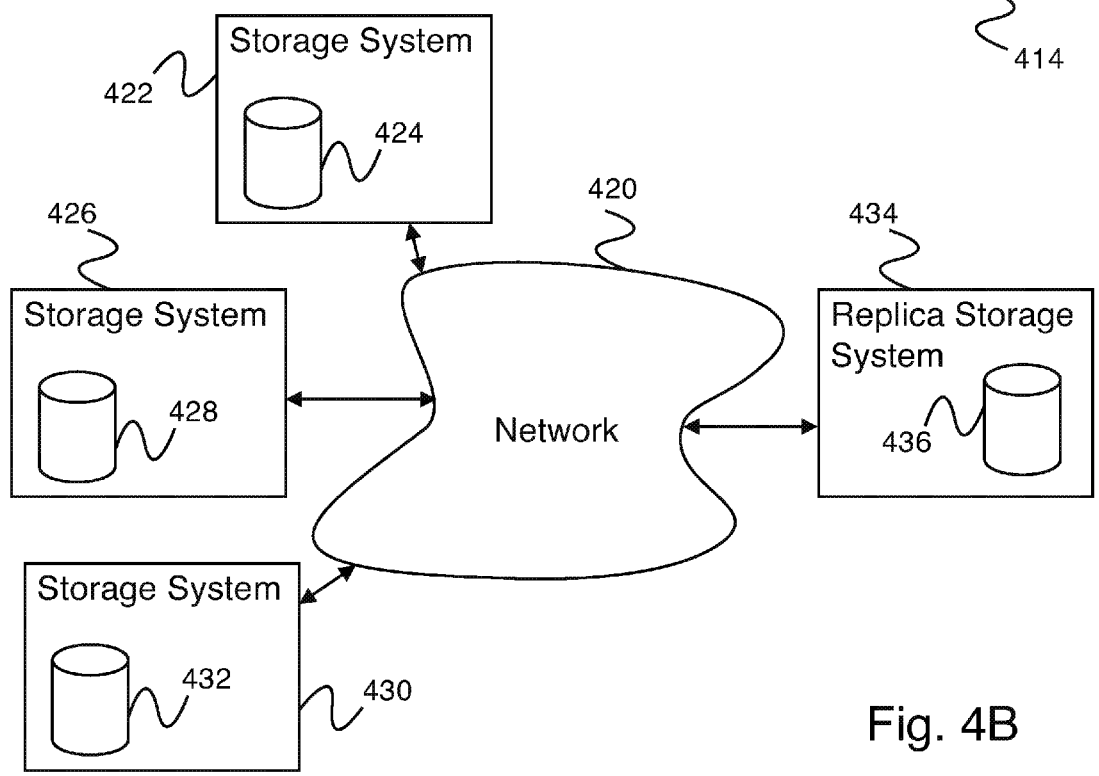
FIG. 4B is a block diagram illustrating an embodiment of a network system with data replication.

FIG. 4B is a block diagram illustrating an embodiment of a network system with data replication. In some embodiments, the network system shown comprises an embodiment of the network system shown in FIG. 1. In the example shown, network 420 connects storage systems 422, 426 and 430 with replica storage system 434. Storage systems 422, 426 and 430 store data in storage devices 424, 428 and 432 respectively, and replica storage system 434 stores data in storage device 436. Replica storage system 434 replicates data stored by storage systems 422, 426 and 430 on storage devices 424, 428 and 432 on storage device 436. Replica storage system 434 replicates a portion of or all of the data stored by storage systems 422, 426 and 430. In various embodiments, one, two, four, or any other appropriate number of storage systems are replicated by replica storage system 434.

Figure 4C:
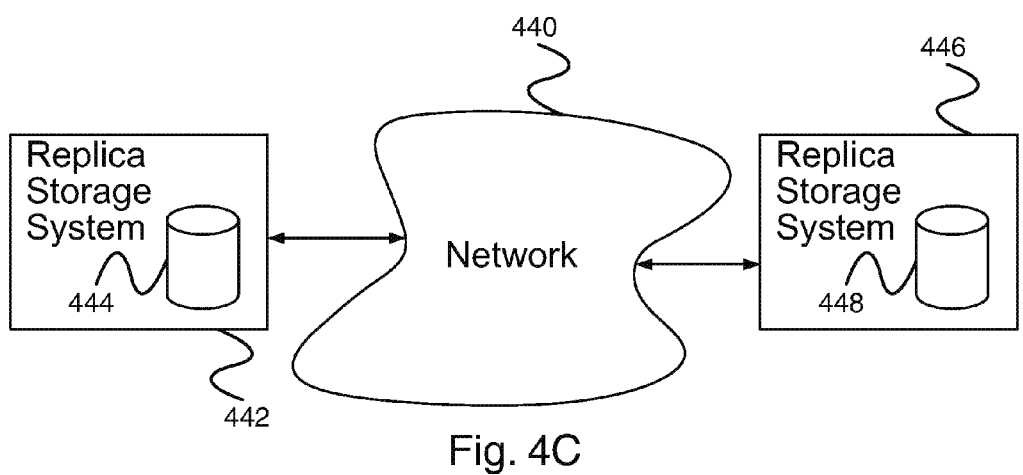
FIG. 4C is a block diagram illustrating an embodiment of a network system with data replication.

FIG. 4C is a block diagram illustrating an embodiment of a network system with data replication. In some embodiments, the network system shown comprises an embodiment of the network system shown in FIG. 1. In the example shown, network 440 connects replica storage system 442 and replica storage system 446. Replica storage system 442 and replica storage system 446 store data in storage device 444 and storage device 448, respectively. Replica storage system 446 replicates on storage device 448 a portion or all of the data stored by replica storage system 442 on storage device 444, and replica storage system 442 replicates on storage device 444 a portion or all of the data stored by replica storage system 446 on storage device 448. In various embodiments, one, two, four, or any other appropriate number of storage systems are replicated by replica storage systems 442 and 446.

In various embodiments, there are the following: a "many-to-many" topology, where A and B both replicate to both of C and D; a "many-to-many, peer-to-peer" topology, where A and B both replicate to both of C and D, and where C and D both replicate to both of A and B; and, a "cascading" topology, where A replicates to B, B replicates to C, C replicates to D, etc.; or any other appropriate topology for one or more replicating systems replicating one or more data storage systems where a storage system can comprise a replicating system and/or a replicating system can comprise a storage system. In various embodiments, A, B, C, and D each comprise a storage system, a replica storage system, or a combination of a storage system and a replica storage system.

In various embodiments, a replica storage system replicates all of the data stored by a storage system, a portion of the data stored by a storage system, a predetermined fraction of the data stored by a storage system, or any other appropriate subset of the data stored by a storage system. In various embodiments, a replica storage system replicates data from one storage system, from more than one storage system, from a predetermined number of storage systems, or from any other appropriate number of storage systems.

Figure 5:
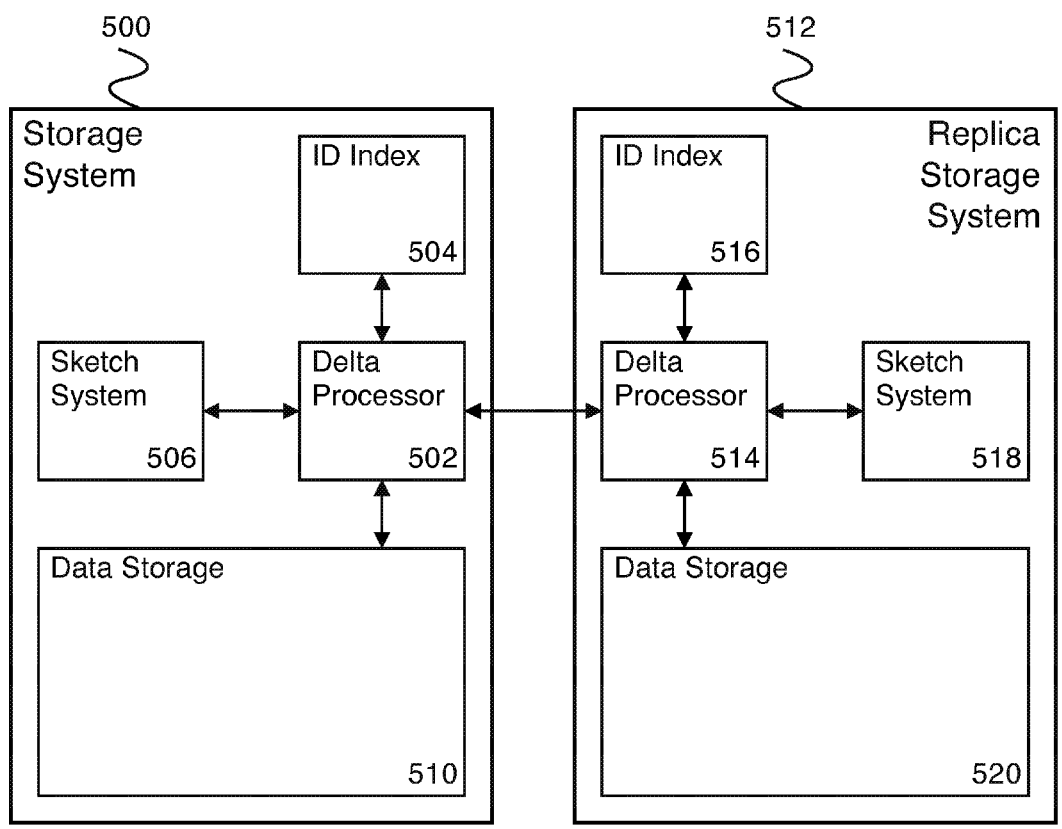
FIG. 5 is a block diagram illustrating an embodiment of a system for data replication with delta compression.

FIG. 5 is a block diagram illustrating an embodiment of a system for data replication with delta compression. In some embodiments, the system shown is used by the network system of FIG. 1 for data replication with delta compression. In the example shown, storage system 500 stores data in data storage device 510, and replica storage system 512 stores data in data storage device 520. Storage system 500 communicates with replica storage system 512 using a network (e.g., network 100 of FIG. 1). In some embodiments, a delta compression system stores a segment by storing a reference to a previously stored segment that is similar to the segment and a delta (e.g., a difference between the previously stored segment and the segment). Storage efficiency is achieved in the event that the reference plus the delta requires less storage space than storing the segment. In some embodiments, the previously stored segment that is similar is identified using a sketch system, wherein the sketch comprises a characterization of the segment that enables identifying similar segment by examining the sketch of the similar segment and the sketch of the segment. In some embodiments, the delta system stores a segment by storing a reference to a plurality of previously stored segments and portions of the previously stored segments and any differences from the previously stored segments (e.g., insertions or deletions) that are needed to be able to reconstruct the segment. In some embodiments, a segment is stored referring to a segment that is itself stored as a reference and a delta. In various embodiments, identical segments are not stored/transmitted instead a reference is stored/transmitted, similar segments are not stored/transmitted instead one or more references and one or more deltas are stored/transmitted, or any other appropriate manner of encoding the storage and/or transmission of segments.

Storage system 500 uses delta processor 502 to perform delta compression on stored data before transmitting it to replica storage system 512. Replica storage system 512 uses delta processor 514 to perform delta decompression on received data before storing it in data storage 520. Sketch system 506 and ID index 504 assist delta processor 502 with delta compression and sketch system 518 and ID index 516 assist delta processor 514 with delta decompression. In various embodiments, sketch system 506 comprises a list or index or cache of sketches of all data segments stored in data storage 510, a list or index or cache of sketches of some of the data segments stored in data storage 510, a list or index or cache of sketches of a predetermined number of the data segments stored in data storage 510, or a list or index or cache of sketches of any other appropriate number of the data segments stored in data storage 510. In various embodiments, sketch system 518 comprises a list or index or cache of sketches of all data segments stored in data storage 520, a list or index or cache of sketches of some of the data segments stored in data storage 520, a list or index or cache of sketches of a predetermined number of the data segments stored in data storage 520, or a list or index or cache of sketches of any other appropriate number of the data segments stored in data storage 520. Delta processor 502, ID index 504, and sketch system 506 comprise a delta compression system (e.g., delta compression system 114 of FIG. 1). Delta processor 514, ID index 516, and sketch system 518 comprise a delta compression system (e.g., delta compression system 124 of FIG. 1).

Figure 6:
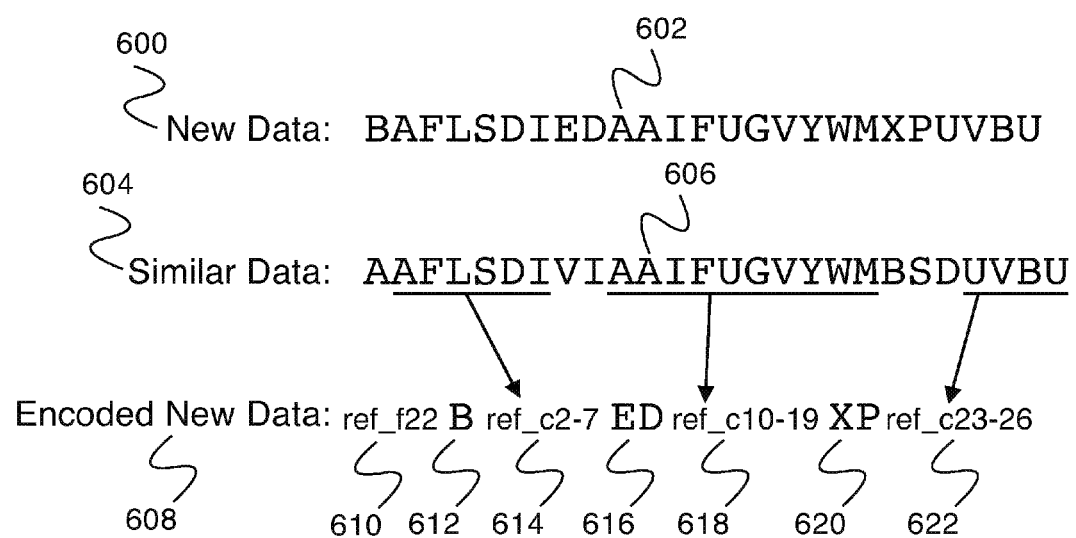
FIG. 6 is a diagram illustrating an embodiment of delta compression.

FIG. 6 is a diagram illustrating an embodiment of delta compression. In some embodiments, delta compression is performed by delta compressor 502 of FIG. 5. In the example shown, new data 600 is to be delta compressed. New data 600 comprises character sequence 602. Similar data 604 has been identified previously to be similar to new data 600. Similar data 604 comprises character sequence 606. In various embodiments, similar data 604 is identified to be similar to new data 600 using a sketch system, a sketch index, a sketch cache, data searching, or by any other appropriate method. Encoded new data 608 comprises reference 610 (e.g., a reference to a previously stored segment), character sequence references 614, 618, and 622 (e.g., a reference to a sequence of data from within the previously stored segment identifying the subset of the segment for example using offsets, lengths or any other appropriate manner of identifying the subset), and character sequences 612, 616, and 620 (e.g., a sequence of data—for example, a string of characters, bytes, integers, whole numbers or other—that is to be inserted in between the reference sequences). Reference 610 refers to similar data 604 and indicates that the character sequence references refer to character sequences found in similar data 604. Character sequence reference 614 indicates that characters 2-7 of similar data 604 are to be inserted in its position when reconstructing new data 600 from encoded new data 608; character sequence reference 618 indicates that characters 10-19 of similar data 604 are to be inserted in its position when reconstructing new data 600 from encoded new data 608; and character sequence reference 622 indicates that characters 23-26 of similar data 604 are to be inserted in its position when reconstructing new data 600 from encoded new data 608. Character sequences 612, 616, and 620 are not found in similar data 604, so they appear unchanged in encoded new data 608 and remain when new data 600 is reconstructed from encoded new data 608.

In some embodiments, the encoding comprises an indication of a set of data blocks in the second data segment not present in the third previous data segment and an indication of a set of data blocks in the third previous data segment. In some embodiments, encoded new data sequences use other encoding schemes that enable the indication of using portion(s) of a previously stored segment and differences (e.g., similar to the character sequences above) to store a new data segment. In various embodiments, the similar data and the new data comprise sets of characters, bytes, integers, whole numbers, dates, and/or any other appropriate data or combination thereof.

In some embodiments, the delta encoding comprises an ordered set of copy and insert instructions. New data 600 and similar data 604 are first broken into regions. Region boundaries are determined using file boundaries, directory boundaries, byte counts, content-based boundaries (e.g., when a hash of data in a window is equal to a value), or any other appropriate method of determining a boundary. ID data is computed for each region of new data 600 and similar data 604. ID data for a given data region is derived from the content of the data of the region and is generated deterministically (e.g., a digital fingerprint, digital signature, using a hash function, a checksum, a cryptographic hash function, etc.). The IDs of regions of similar data 604 are kept in a searchable list. The list of region IDs from similar data 604 is checked for each region ID from new data 600. If a region ID from new data 600 is not found in the list of region IDs from new data 600, an insert instruction is added to encoded new data 608, followed by the corresponding data region from new data 600.

If a region ID from new data 600 is found in the list of region IDs from new data 600, the corresponding data regions are identical. The regions are then extended from the front and back while checking to make sure that the regions still match. When the largest possible matching region has been found, a copy instruction is added to encoded new data 608 indicating to copy the matching region from similar data 604 when decoding encoded new data 608. If extending the ends of the data region causes the region to overlap data that has been included in encoded new data 608 as part of a previous copy or insert instruction, the previous instruction is modified to remove the overlap. The copy and insert instructions are stored or transmitted when the entire new data 600 can be reconstructed from the copies of similar data 604 and the insertions.

In some embodiments, data from two or more similar segments is used to encode a new data segment. Reconstruction of data from the two or more similar segment encoding is achieved using copy references to region(s) of the two or more similar segments and insertions.

Figure 7:
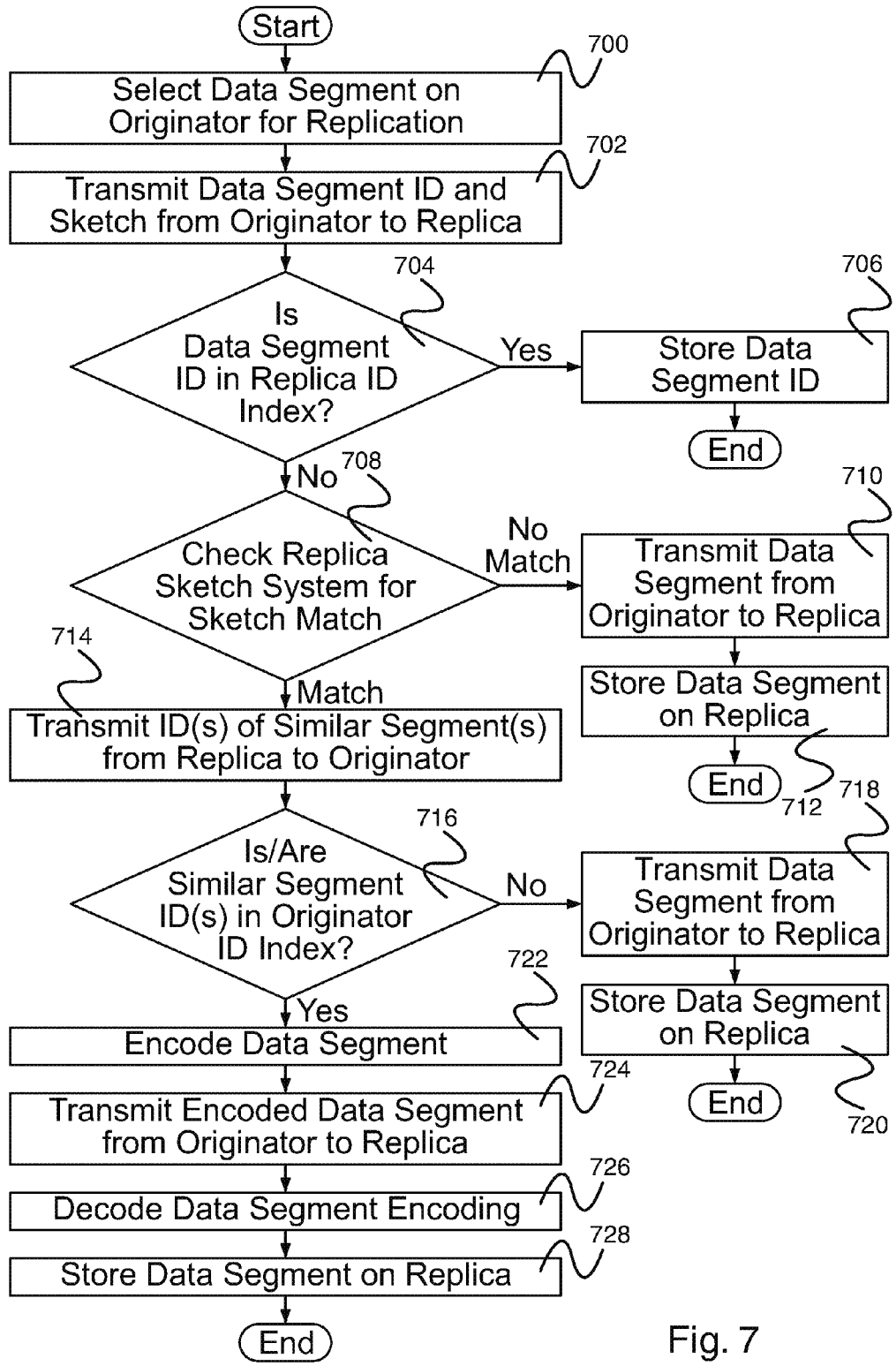
FIG. 7 is a flow diagram illustrating an embodiment of a process for data replication with delta compression.

FIG. 7 is a flow diagram illustrating an embodiment of a process for data replication with delta compression. In some embodiments, the process of FIG. 7 is used by the system of FIG. 5 for data replication with delta compression. In the example shown, in 700, a data segment on the originator is selected for replication. The originator is a storage system (e.g., storage system 500 of FIG. 5). In 702, the data segment ID and sketch are transmitted from the originator to the replica. The data segment ID is used to determine whether the data segment is identical to a data segment stored on the replica. The data segment sketch is used to determine whether the data segment is similar to a data segment stored on the replica. The replica is a replica storage system (e.g., replica storage system 512 of FIG. 5). In 704, the replica ID index (e.g., replica ID index 516 of FIG. 5) is checked for the data segment ID. If the data segment ID is found in the replica ID index, the replica has a data segment that is determined to be identical to the data segment selected in 700, and control then passes to 706. In 706, the data segment ID is stored in the replica system, and the process ends. The selected data segment is not stored after it is determined to be identical to a data segment on the replica. If the data segment ID is not found in the replica ID index in 704, it is not determined that the data segment is already stored in the replica, and control passes to 708.

In some embodiments, step 704 is skipped and control passes directly from step 702 to step 708. In some embodiments, the identity matching is skipped and the similarity matching is used for storing identical segments where encoding for the stored segment is a reference to the previously stored segment and a delta, where the delta is a null set.

In 708, the replica sketch system (e.g., replica sketch system 518 of FIG. 5) is checked for a sketch match. In various embodiments, a sketch system includes a sketch index, does not include a sketch index, matches sketches using all elements of the sketches, matches sketches using some elements of the sketches, or any other appropriate manner of determining similarity between segments using a sketch. In various embodiments, a sketch system comprises a sketch index which associates data segment sketches with data segment IDs, a sketch cache which associates a subset of data segment sketches with data segment IDs, or any other appropriate system for identifying similar sketches (e.g., those using metadata 308 and associated segment data 306). In various embodiments, a sketch cache is comprised of data-stream locality information, identity matching information, storage sub-system information, temporal locality, spatial locality, access patterns, historical patterns, or any other appropriate information. If there is not a sketch match, then it is not determined that the originator and the replica both have an identical data segment that is similar to the data segment selected in 700, and control passes to 710. In 710, the data segment is transmitted from the originator to the replica. In 712, the data segment is stored on the replica, and the process ends. In various embodiments, the data segment is compressed, replicated, or processed in any other appropriate way. In some embodiments, data segment metadata (e.g., a data segment sketch, a data segment ID, etc.) is stored associated with the data segment. If there is a sketch match, then the data segment is similar to a data segment stored on the replica, and control passes to 714. In some embodiments, the data segment is similar to more than one data segment stored on the replica and can be stored or encoded on the replica (or transmitted to the replica) by using references and deltas from the more than one similar data segments. In various embodiments, the one or more data segments identified or selected to be similar to the data segment are identified or selected based at least in part on one or more of the following: temporal locality (e.g., a segment received at a time similar to the time another segment is received), spatial locality (e.g., a segment stored in a location similar or close to another segment), ease of access (e.g., a segment is readily accessed as compared to another segment, located at an access point, located at a memory boundary, etc.), expected compression (e.g., the segment is expected to compress to a desirable size, below a threshold size, etc.), frequency of selection for other compressed segments (e.g., the segment is used as a reference to store a plurality of other segments, where the plurality is above a threshold size or is a maximum or in a "top ten" or other list, etc.), or based on any other appropriate criteria.

In 714, the ID(s) of the similar segment(s) is transmitted from the replica to the originator, and the ID of the similar segment(s) stored on the replica is received by the originator. In 716, the originator ID index (e.g., originator ID index 504 of FIG. 5) is checked for the ID(s) of the similar segment(s). If the similar segment ID(s) is/are not found in the originator ID index, then it is not determined that the originator has the similar data segment(s) in its storage system, and control passes to 718. In 718, the data segment is transmitted from the originator to the replica. In 720, the data segment is stored on the replica, and the process ends. In some embodiments, data segment metadata (e.g., a sketch, an ID, etc.) is also stored associated with the data segment. If the similar segment ID(s) is found in the originator ID index in 716, then the originator and the replica both have an identical data segment(s) that is similar to the data segment selected in 700, and control passes to 722. In 722, the data segment is encoded. In various embodiments, the encoding refers to the similar data segment(s), the encoding is a set of differences between the data segment selected in 700 and the similar data segment(s), the encoding is delta compression (e.g., delta compression of FIG. 6), or the encoding is any other appropriate encoding. In some embodiments, the encoding for replication refers to a different segment than the encoding for storage on the primary system. In various embodiments, the originator transmits confirmation that the originator has the similar data segment(s). In 724, the encoded data segment is transmitted from the originator to the replica. In various embodiments, the encoded data segment is transmitted to another system and not stored for replication but instead transmitted on to yet another system or displayed without actually being stored so that a replication of the encoded data segment does not occur at the other system. In various embodiments, the encoding is stored, compressed, replicated, or processed in any other appropriate way. In 726, the data segment encoding is decoded. In 728, the data segment is stored on the replica, and the process ends.

In some embodiments, the encoding or the representation of the data segment as one or more references and one or more deltas is checked to see if the encoded segment is smaller than the segment itself or smaller than some percentage of the segment size (e.g., 80% of the original size) before using the encoded version of the segment instead of the segment itself for transmission or storage.

Figure 8:
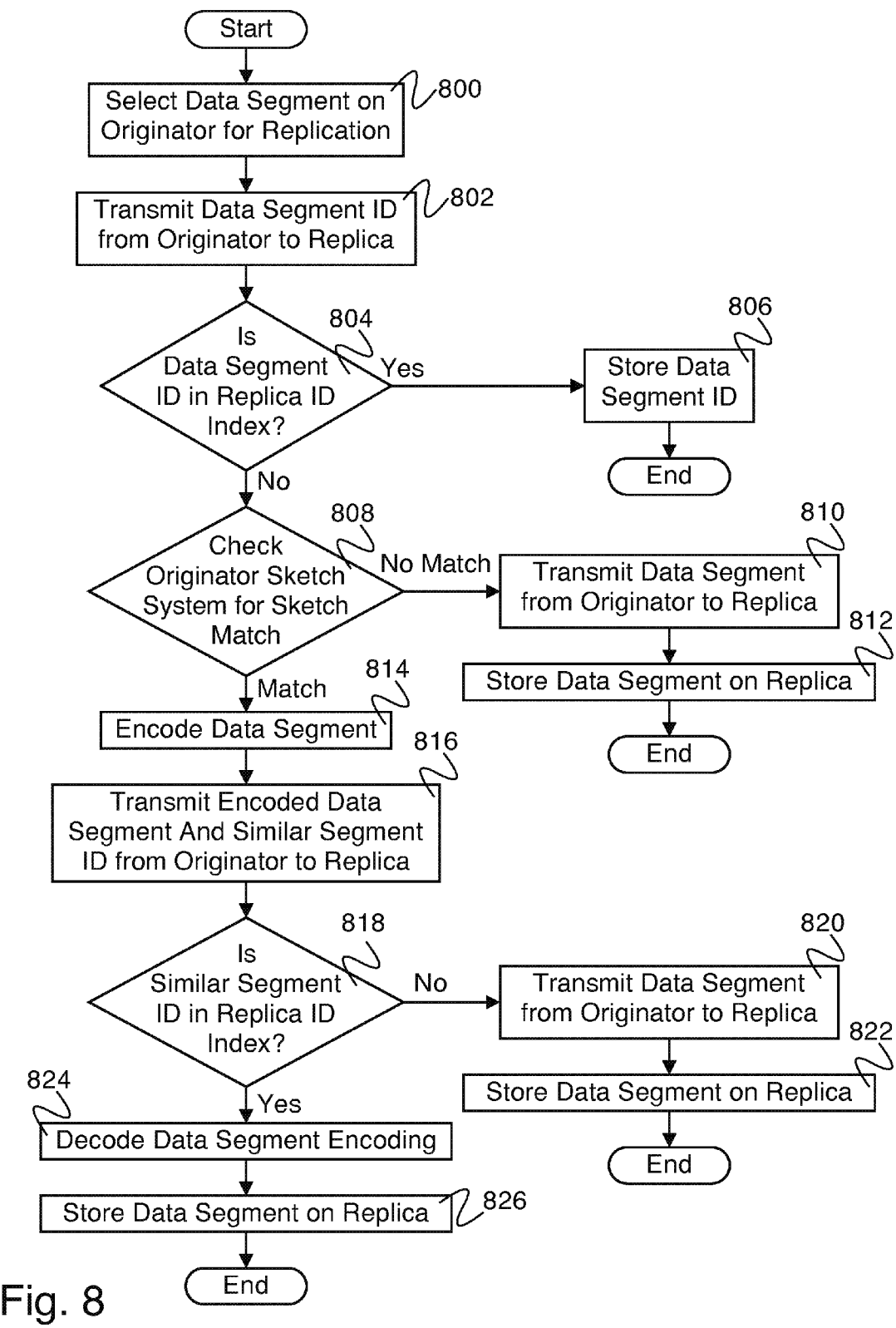
FIG. 8 is a flow diagram illustrating an embodiment of a process for data replication with delta compression.

FIG. 8 is a flow diagram illustrating an embodiment of a process for data replication with delta compression. In some embodiments, the process of FIG. 8 is used by the system of FIG. 5 for data replication with delta compression. In the example shown, in 800, a data segment on the originator is selected for replication. The originator is a storage system (e.g., storage system 500 of FIG. 5). In 802, the data segment ID is transmitted from the originator to the replica. The data segment ID is used to determine whether the data segment is identical to a data segment stored on the replica. The replica is a replica storage system (e.g., replica storage system 512 of FIG. 5). In 804, the replica ID index (e.g., replica ID index 516 of FIG. 5) is checked for the data segment ID. If the data segment ID is found in the replica ID index, the replica has a data segment that is identical to the data segment selected in 800 and control passes to 806. In 806, the data segment ID is stored in the replica system, and the process ends. The selected data segment is not stored after it is determined to be identical to a data segment on the replica. If the data segment ID is not found in the replica ID index in 804, it is not determined that the data segment is already stored in the replica, and control passes to 808.

In various embodiments, steps 802 and/or 804 and/or 818 are skipped and control passes directly from step 800 to step 808 and/or from step 816 to step 824. In some embodiments, this is referred to as "delta collection replication," where the originator knows exactly what is on the replica because the replica is a perfect mirror of the originator up until that point—as long as the originator picks a similar segment that it knows it already transmitted, the replica does not have to verify that it already has it.

The data segment sketch is used to determine whether the data segment is similar to a data segment stored on the replica. In 808, the originator sketch system (e.g., originator sketch system 506 of FIG. 5) is checked for a sketch match. In various embodiments, a sketch system includes a sketch index, does not include a sketch index, matches sketches using all elements of the sketches, matches sketches using some elements of the sketches, or any other appropriate manner of determining similarity between segments using a sketch. In various embodiments, a sketch system comprises a sketch index which associates data segment sketches with data segment IDs, a sketch cache which associates a subset of data segment sketches with data segment IDs, or any other appropriate system for identifying similar sketches (e.g., those using metadata 308 and associated segment data 306). In various embodiments, a sketch cache is comprised of datastream locality information, identity matching information, storage sub-system information, temporal locality, spatial locality, access patterns, historical patterns, or any other appropriate information. If there is not a sketch match, then the data segment is not similar to any data segment stored on the originator, and control passes to 810. In 810 the data segment is transmitted from the originator to the replica. In 812, the data segment is stored on the replica, and the process ends. In various embodiments, the data segment is compressed, replicated, or processed in any other appropriate way. In some embodiments, data segment metadata (e.g., a data segment sketch, a data segment ID, etc.) is stored associated with the data segment. If there is a sketch match, then the originator has a data segment that is similar to the data segment selected in 800, and control passes to 814. In some embodiments, the data segment is similar to more than one data segment stored on the replica and can be stored or encoded on the replica (or transmitted to the replica) by using references and deltas from the more than one similar data segments. In various embodiments, the one or more data segments identified or selected to be similar to the data segment are identified or selected based at least in part on one or more of the following: temporal locality (e.g., a segment received at a time similar to the time another segment is received), spatial locality (e.g., a segment stored in a location similar or close to another segment), ease of access (e.g., a segment is readily accessed as compared to another segment, located at an access point, located at a memory boundary, etc.), expected compression (e.g., the segment is expected to compress to a desirable size, below a threshold size, etc.), frequency of selection for other compressed segments (e.g., the segment is used as a reference to store a plurality of other segments, where the plurality is above a threshold size or is a maximum or in a "top ten" or other list, etc.), or based on any other appropriate criteria.

In 814, the data segment is encoded. In various embodiments, the encoding refers to the similar data segment, the encoding is a set of differences between the data segment selected in 800 and the similar data segment, the encoding is delta compression (e.g., delta compression of FIG. 6), or the encoding is any other appropriate encoding. In various embodiments, the encoding is stored, compressed, replicated, or processed in any other appropriate way. In 816, the encoded data segment and the ID of the similar segment are transmitted from the originator to the replica. In 818, the replica ID index (e.g., replica ID index 516 of FIG. 5) is checked for the ID of the similar segment. If the similar segment ID is not found in the replica ID index, then it is not determined that the originator and the replica have an identical data segment that is similar to the data segment selected in 800, and control passes to 820. In 820 the data segment is transmitted from the originator to the replica. In various embodiments, the data segment is compressed, replicated, or processed in any other appropriate way. In 822, the data segment is stored on the replica, and the process ends. In some embodiments, data segment metadata (e.g., a sketch, an ID, etc.) is also stored associated with the data segment. If the similar segment ED is found in the replica ID index in 818, then the originator and the replica both have an identical data segment that is similar to the data segment selected in 800, and control passes to 824. In various embodiments, the originator receives confirmation that the replica has the similar data segment. In 824, the data segment encoding is decoded. In 826, the data segment is stored on the replica, and the process ends.

In some embodiments, the encoding or the representation of the data segment as one or more references and one or more deltas is checked to see if the encoded segment is smaller than the segment itself or smaller than some percentage of the segment size (e.g., 80% of the original size) before using the encoded version of the segment instead of the segment itself for transmission or storage.

Figure 9:
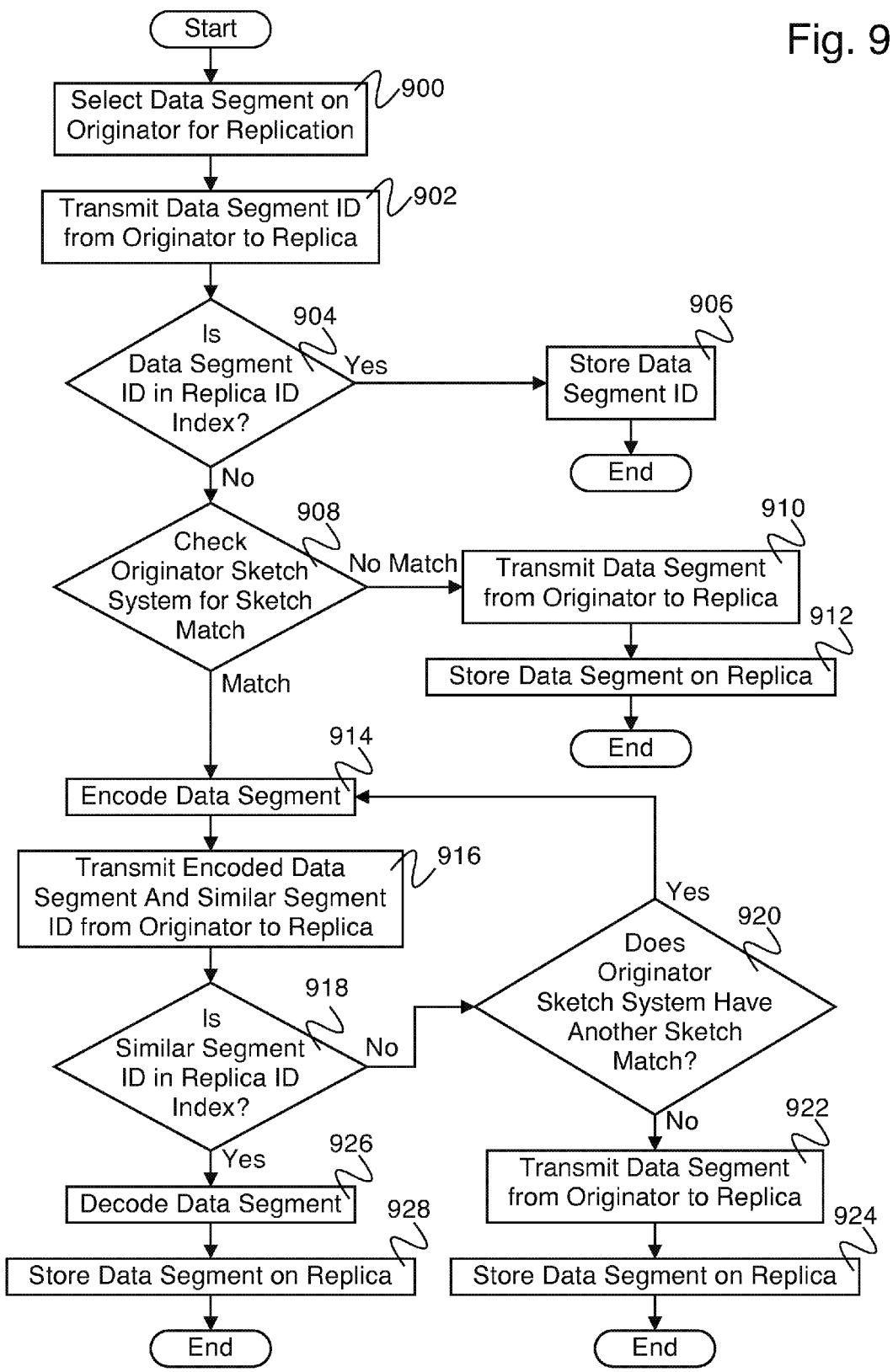
FIG. 9 is a flow diagram illustrating an embodiment of a process for data replication with delta compression.

FIG. 9 is a flow diagram illustrating an embodiment of a process for data replication with delta compression. In some embodiments, the process of FIG. 9 is used by the system of FIG. 5 for data replication with delta compression. In the example shown, in 900, a data segment on the originator is selected for replication. The originator is a storage system (e.g., storage system 500 of FIG. 5). In 902, the data segment ID is transmitted from the originator to the replica. The data segment ID is used to determine whether the data segment is identical to a data segment stored on the replica. The replica is a replica storage system (e.g., replica storage system 512 of FIG. 5). In 904, the replica ID index (e.g., replica ID index 516 of FIG. 5) is checked for the data segment ID. If the data segment ID is found in the replica ID index, the replica has a data segment that is identical to the data segment selected in 900, and control passes to 906. In 906, the data segment ID is stored in the replica system, and the process ends. The selected data segment is not stored after it is determined to be identical to a data segment on the replica. If the data segment ID is not found in the replica ID index in 904, it is not determined that the data segment is already stored in the replica, and control passes to 908.

In various embodiments, steps 902 and/or 904 and/or 918 are skipped and control passes directly from step 900 to step 908 and/or from step 916 to step 926. Identity checks in some embodiments, are not necessary—for example, in the event that the originator and replica systems have identical segment storage (e.g., they act as mirrors and always have the same segments stored).

The data segment sketch is used to determine whether the data segment is similar to a data segment stored on the replica. In 908, the originator sketch system (e.g., originator sketch system 506 of FIG. 5) is checked for a sketch match. In various embodiments, a sketch system includes a sketch index, does not include a sketch index, matches sketches using all elements of the sketches, matches sketches using some elements of the sketches, or any other appropriate manner of determining similarity between segments using a sketch. In various embodiments, a sketch system comprises a sketch index which associates data segment sketches with data segment IDs, a sketch cache which associates a subset of data segment sketches with data segment IDs, or any other appropriate system for identifying similar sketches (e.g., those using metadata 308 and associated segment data 306). In various embodiments, a sketch cache is comprised of datastream locality information, identity matching information, storage sub-system information, temporal locality, spatial locality, access patterns, historical patterns, or any other appropriate information. If there is not a sketch match, then the data segment is not determined to be similar to any data segment stored on the originator, and control passes to 910. In 910, the data segment is transmitted from the originator to the replica. In 912, the data segment is stored on the replica, and the process ends. In various embodiments, the data segment is compressed, replicated, or processed in any other appropriate way. In some embodiments, data segment metadata (e.g., a data segment sketch, a data segment ID, etc.) is stored associated with the data segment. If there is a sketch match, then the originator has a data segment that is similar to the data segment selected in 900, and control passes to 914. In some embodiments, the data segment is similar to more than one data segment stored on the originator and can be transmitted to the replica by using references and deltas from the more than one similar data segments. In various embodiments, the one or more data segments identified or selected to be similar to the data segment are identified or selected based at least in part on one or more of the following: temporal locality (e.g., a segment received at a time similar to the time another segment is received), spatial locality (e.g., a segment stored in a location similar or close to another segment), ease of access (e.g., a segment is readily accessed as compared to another segment, located at an access point, located at a memory boundary, etc.), expected compression (e.g., the segment is expected to compress to a desirable size, below a threshold size, etc.), frequency of selection for other compressed segments (e.g., the segment is used as a reference to store a plurality of other segments, where the plurality is above a threshold size or is a maximum or in a "top ten" or other list, etc.), or based on any other appropriate criteria.

In 914, the data segment is encoded. In various embodiments, the encoding refers to the similar data segment, the encoding is a set of differences between the data segment selected in 900 and the similar data segment, the encoding is delta compression (e.g., delta compression of FIG. 6), or the encoding is any other appropriate encoding. In various embodiments, the encoding is stored, compressed, replicated, or processed in any other appropriate way. In some embodiments, data segment metadata (e.g., a sketch, an ID, etc.) is also stored associated with the data segment. In 916, the encoded data segment and the ID of the similar segment are transmitted from the originator to the replica.

In 918, the replica ID index (e.g., replica ID index 516 of FIG. 5) is checked for the ID of the similar segment. If the similar segment ID is not found in the replica ID index, then it is not determined that the originator and the replica have an identical data segment that is similar to the data segment selected in 900, and control passes to 920. In 920, the originator sketch system is checked to see if there is another suitable sketch match. In some embodiments, a sketch match is suitable if it is determined that the replica system has or is likely to have the associated similar data segment. In some embodiments, a sketch match is not suitable if more than a predetermined threshold of sketches have already been tried. If another suitable sketch match is identified, then the data segment is similar to another segment stored on the originator, and control passes back to 914. If another suitable sketch match is not identified, then the data segment is not similar to any data segment stored on the originator, and control passes to 922. In 922 the data segment is transmitted from the originator to the replica. In various embodiments, the data segment is compressed, replicated, or processed in any other appropriate way. In 924, the data segment is stored on the replica, and the process ends. In some embodiments, the segment is stored with associated metadata (e.g., ID and/or sketch). If the similar segment ID is found in the replica ID index in 918, then the originator and the replica both have an identical data segment that is similar to the data segment selected in 900, and control passes to 926. In various embodiments, the originator receives confirmation that the replica has the similar data segment. In 926, the data segment encoding is decoded. In 928, the data segment is stored on the replica, and the process ends.

In various embodiments, step 918 is skipped or is known to be unnecessary and control passes directly from step 916 to step 926. Identity checks in some embodiments, are not necessary—for example, in the event that the originator and replica systems have identical segment storage (e.g., they act as mirrors and always have the same segments stored).

In some embodiments, the encoding or the representation of the data segment as one or more references and one or more deltas is checked to see if the encoded segment is smaller than the segment itself or smaller than some percentage of the segment size (e.g., 80% of the original size) before using the encoded version of the segment instead of the segment itself for transmission or storage.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing data, comprising:
a delta compression system comprising a primary system with a primary system storage device and a processor, and a replica system with a replica system storage device and a processor, wherein the processor of the primary system is configured for:
  transmitting a data segment ID of a second data segment and a sketch of the second data segment to the replica system;
  checking the replica system for a sketch match using the sketch of the second data segment, wherein the sketch match comprises a first data segment on the replica system that is similar to the second data segment, wherein the first data segment on the replica system is determined to be similar to the second data segment when a predetermined fraction of the one or more sketch data of the segments are identical;
in the event the replica system has a sketch match, receiving a data segment ID of the first data segment that is similar to the second data segment on the replica system;
checking the primary system storage for the data segment ID of the first data segment to determine whether the primary system storage also has the first data segment;
in the event that the primary system storage has the first data segment, indicating the primary system storage and the replica systems both have an identical data segment that is similar to the second data segment;
encoding the second data segment, wherein the encoding of the second data segment refers to the first data segment, wherein the encoding comprises determining a difference between the second data segment and the first data segment, and wherein the encoding comprises data from the second segment comprising the determined difference between the second data segment and the first data segment that is on the primary system, and a reference to the first data segment that is on the replica system;
transmitting the encoding of the second data segment to the replica system instead of the second data segment from the primary system, wherein the encoding of the second data segment is smaller than the second data segment, wherein the processor of the replica system is configured for:
decoding the encoding of the second data segment using the first data segment in the replica system;
storing the encoding of the second data segment on the replica system.

2. The system as in claim 1, wherein the processor of the replica system is configured for determining whether the replica system has a sketch match.

3. The system as in claim 1, wherein the processor of the replica system is configured for determining the replica system has a data segment that is identical to the second data segment using the transmitted data segment ID.

4. The system as in claim 3, wherein in the event the replica system has a data segment that is identical to the second data segment, the processor of the replica system is configured for storing the data segment ID of the second data segment instead of storing the second data segment.

5. The system as in claim 3, wherein determining that the replica system has a data segment that is identical to the second data segment further comprises the processor of the primary system is further configured for:
  determining the data segment ID associated with the second data segment;
and wherein the processor the of the replica system is configured for:
  determining whether the data segment ID of the second data segment is identical to a previously stored ID in an ID index on the replica system.

6. The system as in claim 5, wherein determining the data segment ID associated with the second data segment uses one or more of the following: a fingerprint function, a hash function, a cryptographic hash function, and a digital signature.

7. The system as in claim 1, wherein the processor of the primary system is further configured for storing the encoding of the second data segment.

8. The system as in claim 1, wherein the processor of the primary system is further configured for not storing the encoding of the second data segment.

9. The system as in claim 1, wherein the processor of the primary system is further configured for storing an encoding of the second data segment that-references a fourth data segment, wherein the fourth data segment is not the same as the first data segment.

10. The system as in claim 1, wherein the processor of the primary system is configured for compressing the encoding of the second data segment.

11. The system as in claim 10, wherein the transmitted encoding of the second data segment to the replica system is the compressed encoding of the second data segment.

12. The system as in claim 1, wherein the processor of the replica system is configured for storing a decoding of the encoding of the second data segment.

13. The system as in claim 1, wherein the first data segment that is similar to the second data segment is determined using a sketch function.

14. The system as in claim 13, wherein the sketch function comprises a hash function.

15. The system as in claim 13, wherein the sketch function comprises a plurality of hash functions.

16. The system as in claim 13, wherein the sketch function comprises one or more functions that return a same value for similar data segments.

17. The system as in claim 13, wherein the sketch function comprises one or more functions that return a similar value for similar data segments.

18. The system as in claim 13, wherein the sketch function comprises one or more functions that may return a same value for similar data segments.

19. The system as in claim 13, wherein the sketch function comprises one or more functions that may return a similar value for similar data segments.

20. The system as in claim 19, wherein sketch function values are determined to be similar based on one or more of the following methods: numeric difference, hamming distance, locality-sensitive-hashing, or nearest-neighbor-search.

21. The system as in claim 13, wherein the first data segment is identified based at least in part on one or more of the following: temporal locality, spatial locality, ease of access, expected compression, or frequency of selection for other compressed segments.

22. The system as in claim 1, wherein the second data segment is similar to one or more data segments on both the primary and replica systems in addition to the first data segment.

23. The system as in claim 22, wherein the processor of the primary system is further configured for computing an encoding of the second data segment based at least in part on the first data segment and the one or more additional data segments.

24. The system as in claim 1, wherein the second data segment was stored as an encoding of a fourth data segment.

25. The system as in claim 1, wherein the processor of the replica system is configured for:
  receiving the encoding of the second data segment on the replica system.

26. A method for processing data in a delta compression system, comprising:
  transmitting from a primary system a data segment ID of a second data segment and a sketch of the second data segment to a replica system;
  checking the replica system for a sketch match using the sketch of the second data segment, wherein the sketch match comprises a first data segment on the replica system that is similar to the second data segment, wherein the first data segment on the replica system is determined to be similiar to the second data segment when a predetermined fraction of the one or more sketch data of the segments are identical;
  in the event the replica system has a sketch match, receiving a data segment ID of the first data segment that is similar to the second data segment on the replica system;
  checking the primary system storage for the data segment ID of the first data segment to determine whether the primary system storage also has the first data segment;
  in the event that the primary system storage has the first data segment, indicating the primary system storage and the replica systems both have an identical data segment that is similar to the second data segment;
  encoding, using a processor of the primary system, a second data segment, wherein the encoding of the second data segment refers to the first data segment, wherein the encoding comprises determining a difference between the second data segment and the first data segment, and wherein the encoding comprises data from the second segment comprising the determined difference between the second data segment and the first data segment that is on the primary system, and a reference to the first data segment that is on the replica system;
  transmitting the encoding of the second data segment to the replica system instead of the second data segment from the primary system, wherein the encoding of the second data segment is smaller than the second data segment, wherein the processor of the replica system is configured for:
    decoding the encoding of the second data segment using the first data segment in the replica system;
    storing the encoding of the second data segment on the replica system.

27. The method as in claim 26, wherein the checking whether the replica system for a sketch match is done by a processor of the replica system.

28. The method as in claim 26, further comprising determining, using a processor of the replica system, that the replica system has a data segment that is identical to a the second data segment using the transmitted data segment ID.

29. The method as in claim 28, further comprising in the event the replica system has a data segment that is identical to the second data segment, storing, using the processor of the primary system, the data segment ID of the second data segment instead of storing the second data segment.

30. The method as in claim 28, wherein determining that the replica system has a data segment that is identical to the second data segment comprises:
  determining, using the processor of the primary system, a data segment ID associated with the second data segment;
  determining, using the processor of the replica system, whether the data segment ID of the second data segment is identical to a previously stored ID in an ID index on the replica system.

31. The method as in claim 30, wherein determining the first data segment ID associated with the second data segment uses one or more of the following: a fingerprint function, a hash function, a cryptographic hash function, and a digital signature.

32. The method as in claim 26, further comprising storing the encoding of the second data segment on the primary system.

33. The method as in claim 26, further comprising not storing the encoding of the second data segment on the primary system.

34. The method as in claim 26, further comprising storing on the primary system an encoding of the second data segment that references a fourth data segment, wherein the fourth data segment is not the same as the first data segment.

35. The method as in claim 26, further comprising compressing the encoding of the second data segment.

36. The method as in claim 35, further comprising transmitting the compressed encoding of the second data segment.

37. The method as in claim 26, further comprising storing, using a processor of the replica system, a decoding of the encoding of the second data segment.

38. The method as in claim 26, wherein the first data segment that is similar to the second data segment is determined using a sketch function.

39. The method as in claim 38, wherein the sketch function comprises a hash function.

40. The method as in claim 38, wherein the sketch function comprises a plurality of hash functions.

41. The method as in claim 38, wherein the sketch function comprises one or more functions that return the same value for similar data segments.

42. The method as in claim 38, wherein the sketch function comprises one or more functions that return a similar value for similar data segments.

43. The method as in claim 38, wherein the sketch function comprises one or more functions that may return a same value for similar data segments.

44. The method as in claim 38, wherein the sketch function comprises one or more functions that may return a similar value for similar data segments.

45. The method as in claim 44, wherein sketch function values are determined to be similar based on one or more of the following methods: numeric difference, hamming distance, locality-sensitive-hashing, or nearest-neighbor-search.

46. The method as in claim 38, wherein the first data segment is identified based at least in part on one or more of the following: temporal locality, spatial locality, ease of access, expected compression, or frequency of selection for other compressed segments.

47. The method as in claim 26, wherein the second data segment is similar to one or more previous segments in addition to the first data segment.

48. The method as in claim 47, further comprising computing, using the processor of the primary system, an encoding of the second data segment based at least in part on the first data segment and the one or more additional data segments.

49. The method as in claim 26, wherein the second data segment was stored as an encoding of a fourth data segment.

50. The method as in claim 26, further comprising receiving the encoded second data segment on the replica system.

51. A computer program product for processing data, the computer program product being embodied in a non-transitory computer readable storage medium and comprising computer instructions for:
- transmitting from a primary system a data segment ID of a second data segment and a sketch of the second data segment to a replica system;
- checking the replica system for a sketch match using the sketch of the second data segment, wherein the sketch match comprises a first data segment on the replica system that is similar to the second data segment, wherein the first data segment on the replica system is determined to be similar to the second data segment when a predetermined fraction of the one or more sketch data of the segments are identical;
- in the event the replica system has a sketch match, receiving a data segment ID of the first data segment that is similar to the second data segment on the replica system;
- checking the primary system storage for the data segment ID of the first data segment to determine whether the primary system storage also has the first data segment;
- encoding, using a processor of the primary system, a second data segment, wherein the encoding of the second data segment refers to the first data segment, wherein the encoding comprises determining a difference between the second data segment and the first data segment, and wherein the encoding comprises data from the second segment comprising the determined difference between the second data segment and the first data segment that is on the primary system, and a reference to the first data segment that is on the replica system;
- transmitting the encoding of the second data segment to the replica system instead of the second data segment from the primary system, wherein the encoding of the second data segment is smaller than the second data segment, wherein the processor of the replica system is configured for:
  - decoding the encoding of the second data segment using the first data segment in the replica system;
  - storing the encoding of the second data segment on the replica system.

* * * * *